Sept. 5, 1944. G. STUHLFAUTH 2,357,616
MACHINING APPARATUS
Original Filed July 10, 1940 6 Sheets-Sheet 1

INVENTOR
G. STUHLFAUTH
BY Harry C. Duft
ATTORNEY

Sept. 5, 1944.     G. STUHLFAUTH     2,357,616
MACHINING APPARATUS
Original Filed July 10, 1940     6 Sheets-Sheet 2
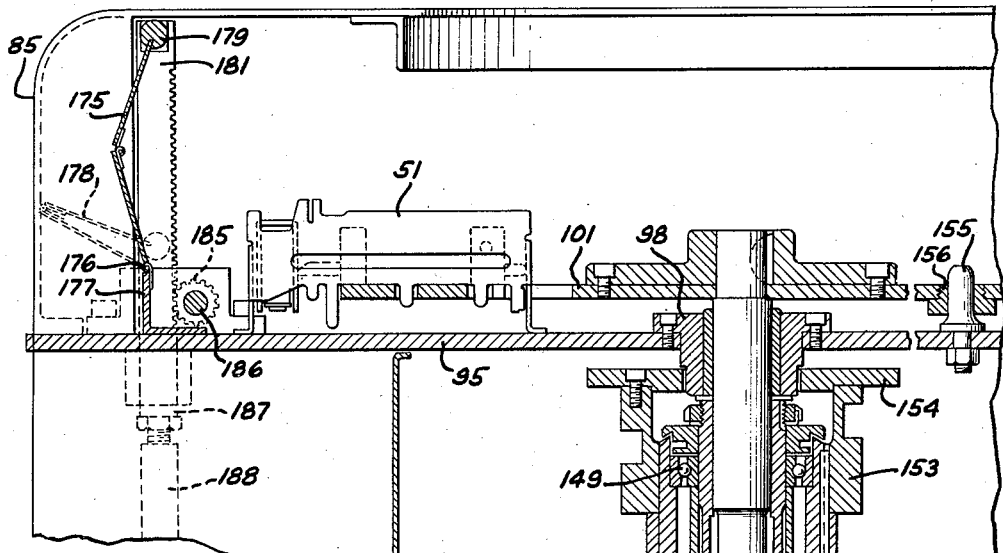
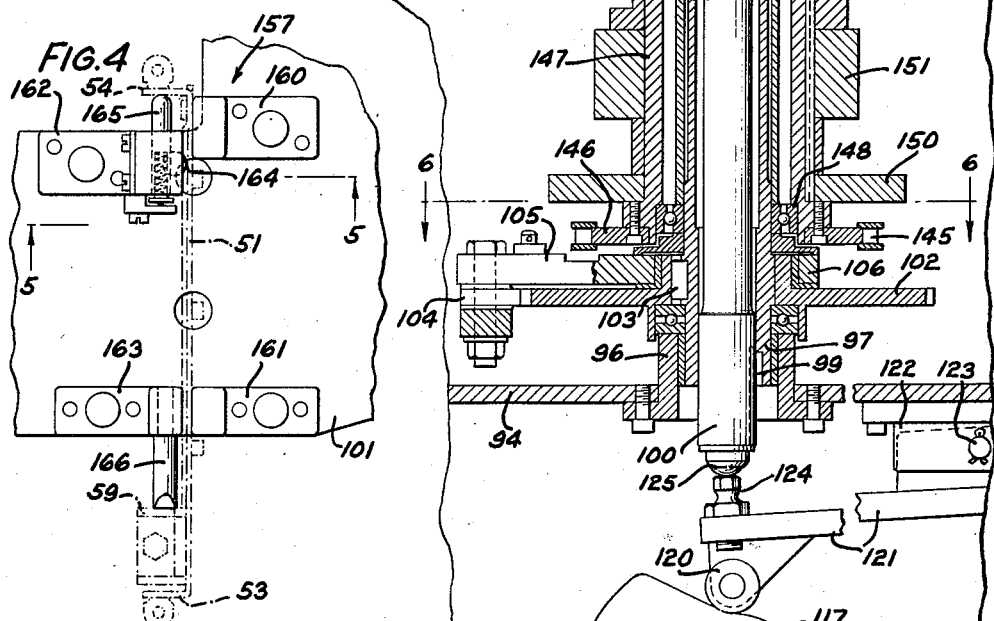
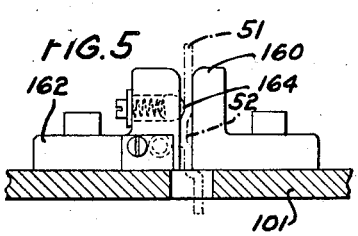
INVENTOR
G. STUHLFAUTH
BY Harry L. Duft
ATTORNEY Sept. 5, 1944.   G. STUHLFAUTH   2,357,616
MACHINING APPARATUS
Original Filed July 10, 1940   6 Sheets-Sheet 3

INVENTOR
G. STUHLFAUTH
BY Harry C. Duft
ATTORNEY

Sept. 5, 1944.  G. STUHLFAUTH  2,357,616
MACHINING APPARATUS
Original Filed July 10, 1940   6 Sheets-Sheet 5

INVENTOR
G. STUHLFAUTH
BY Harry C. Duft
ATTORNEY

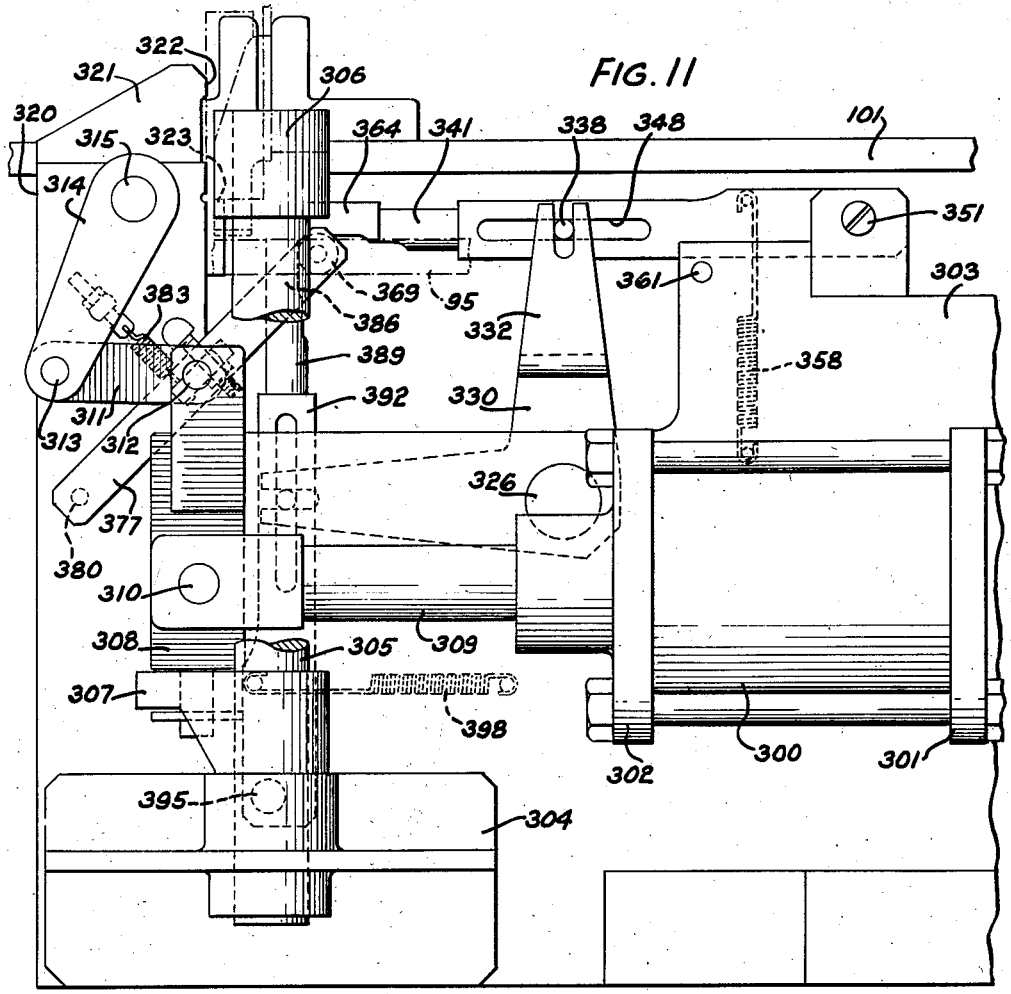
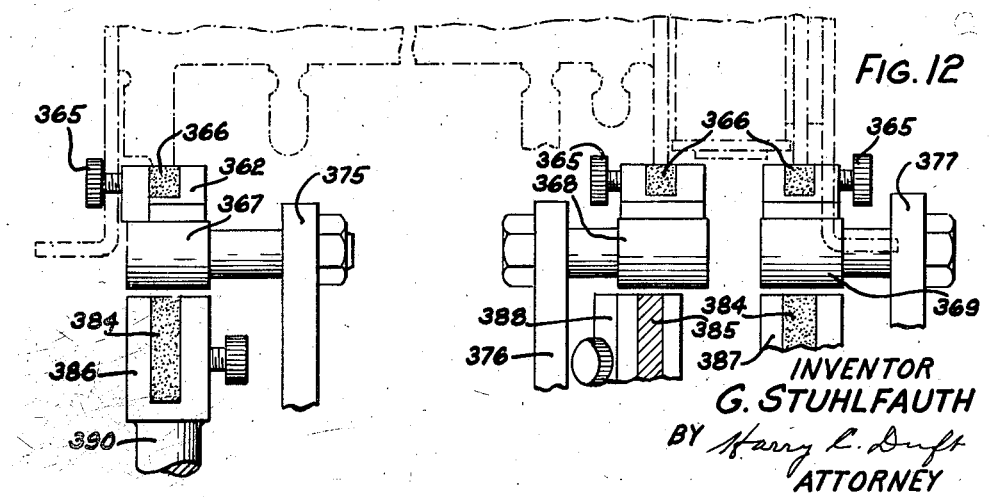

Patented Sept. 5, 1944

2,357,616

UNITED STATES PATENT OFFICE 2,357,616

MACHINING APPARATUS

George Stuhlfauth, Chicago, Ill., assignor to Western Electric Company, Incorporated, New York, N. Y., a corporation of New York Original application July 10, 1940, Serial No. 344,677. Divided and this application April 3, 1942, Serial No. 437,534

11 Claims. (Cl. 51—67)

This invention relates to a machining apparatus and more particularly to an apparatus for machining partially assembled telephone switch units and is a division of the co-pending application of George Stuhlfauth, Serial No. 344,677, filed July 10, 1940.

In the manufacture of precision electrical apparatus, particularly the vertical units adapted for use in automatic telephone exchanges of the cross bar switching type, various parts of the vertical unit are made up of sub-assemblies and assembled to provide a piece of precision apparatus which is expected to operate for years without failure. The cross bar switch vertical units are assembled on frames which carry cooperating parts adapted to be actuated by the vertical unit or control the operation of completing circuits by the vertical unit. It, therefore, becomes essential that the various parts of the apparatus be made with a high degree of precision so that they may be interchangeably assembled. The vertical unit comprises a base member adapted to be mounted on a framework and having fixed thereto an electromagnet, which is formed of a U-shaped pole piece, a core, and a coil wound about the core. The pole pieces are welded to the base member and the core with the coil wound on it is bolted to the pole pieces by providing a threaded portion on the extended end of the core, which extends through the base of the U-shaped pole piece. This unitary structure is adapted to have an armature pivoted on an extension of the base and on one of the legs of the pole piece for actuating switching mechanism when the electromagnet is energized. The base, pole piece, coil and core comprise a sub-assembly for interchangeable assembly with armatures and contact springs to be actuated selectively by the armature. In the manufacture of these sub-assemblies, a number of machining operations are necessary after the various parts of the assembly are assembled and plated and it is to the provision of apparatus for performing these machining operations that the present invention is directed.

It is an object of the present invention to provide apparatus for automatically performing a series of machining operations on precision mechanisms and thereby to reduce the cost of such mechanisms and eliminate numerous manual operations in the manufacture thereof.

In accordance with one embodiment of the invention, a rotary machining apparatus is provided, which includes a turn table automatically indexed step by step about a center spindle to carry a telephone cross bar switch vertical unit to various positions in the apparatus, where machining operations are performed upon it. The apparatus includes separate tool driving motors mounted about the turn table and a main driving motor for driving the turn table and various of the control cams, which control movements of the various tools in timed relation to the indexing of the part being worked upon. Parts to be worked upon are positioned in the machine at a loading and unloading station and are then carried by the machine into association with the various tools which are mounted as separate units within the machine and about the turn table. These tools comprise five separate units, arranged at five stations around the turn table, the first of which end-mills one of the legs of the pole piece of the switch, the second of which performs a stoning operation on five separate surfaces of the part being worked upon; that is, it removes, by means of small stones, the excess plating material deposited at the tip of the pole pieces and a projecting portion of the base to provide a sharp right angle corner on which the armature of the switch may be pivoted. This station also files off the milling burr from the leg of the pole piece which was end-milled in the previous station. The third unit of the machine receives a part upon indexing of the turn table and end-mills the extending end of the magnet core to cut it slightly under-flush with the faces of the pole pieces so that the armature to be actuated by the electromagnet will always be spaced from the core of the electromagnet. The fourth station in the apparatus contains a chamfering tool, which is automatically moved upwardly into engagement with the core of the magnet to remove the milling burr formed in the preceding station. The part is then indexed to the final operating station, where there is provided a supply of lacquer which, by means of wicks, is applied to the machined surface of the core and the machined surface of the pole piece, which was undercut in the first sttaion. After the parts, from which the plating had been removed in the machining operations, are thus recoated, the part is indexed back to the loading and unloading station, from which it may be removed, and a new part is inserted in place of it.

The present application, which is a division of the co-pending application hereinbefore identified, is directed particularly to the portion of the thus briefly described apparatus wherein the stoning and filing operations are performed.

Other related parts of the application, particularly related to the stoning and filing apparatus, will be described and claimed herein.

A better understanding of the invention may be had by reference to the following detailed description, when considered in conjunction with the accompanying drawings, wherein Fig. 1 is a plan view of an apparatus embodying the present invention, part of the cover of the apparatus being broken away to more clearly show the location of the apparatus under the cover;

Fig. 3 is a central sectional view taken substantially on the line 3—3 of Fig. 1 in the direction of the arrows and showing a section through the loading and unloading station and through the central driving spindle and its associated cams and actuating mechanism;

Fig. 4 is an enlarged fragmentary plan view of the switch-holding fixtures at the loading and unloading station, it being understood that there are provided six of these fixtures mounted at spaced intervals about the turn table of the apparatus.

Fig. 5 is a sectional view taken substantially along the line 5—5 of Fig. 4 in the direction of the arrows showing some of the details of the fixture which clamps the part to be worked upon loosely on the turn table during its passage through the apparatus;

Figure 8:
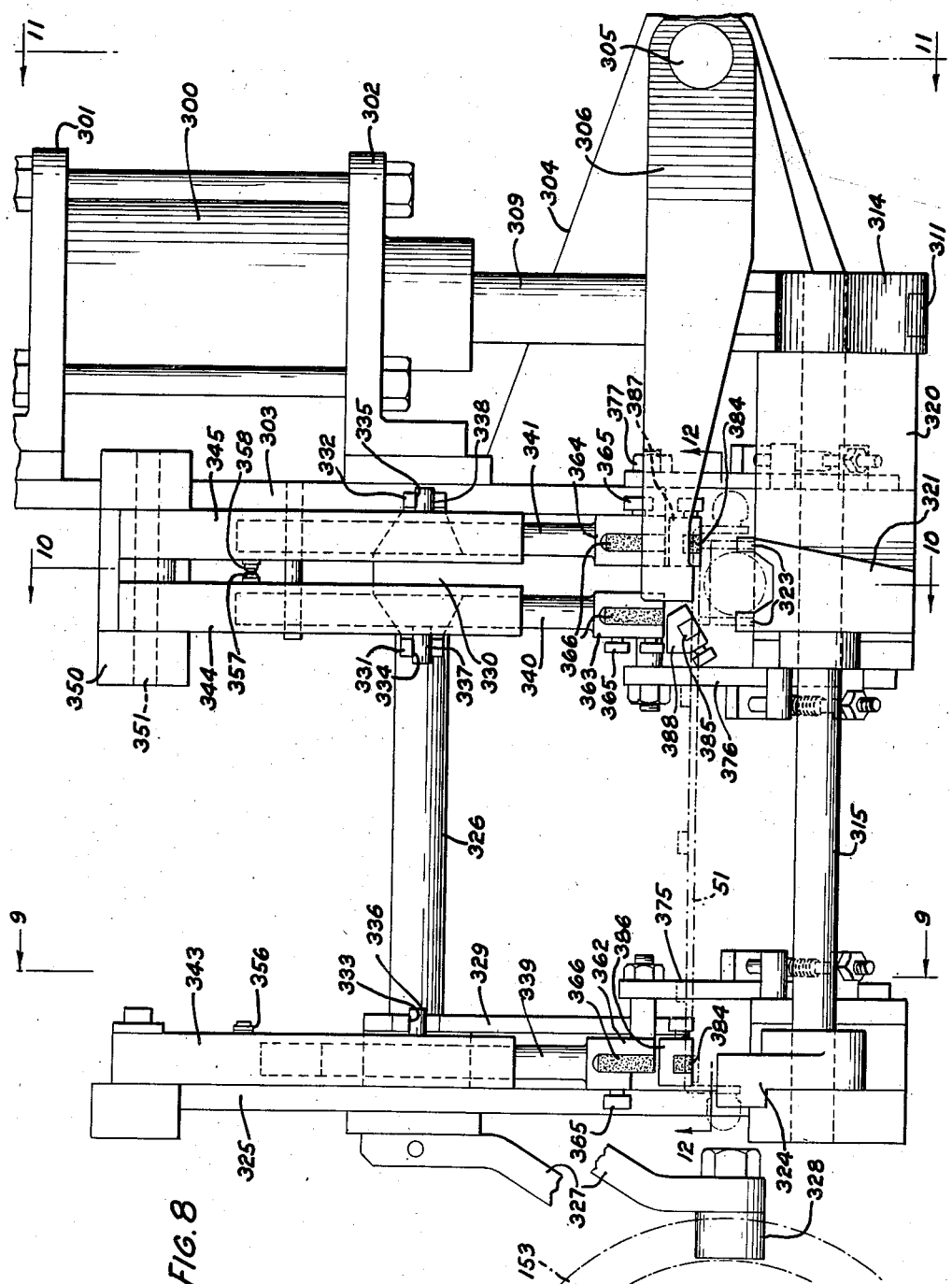
Figure 9:
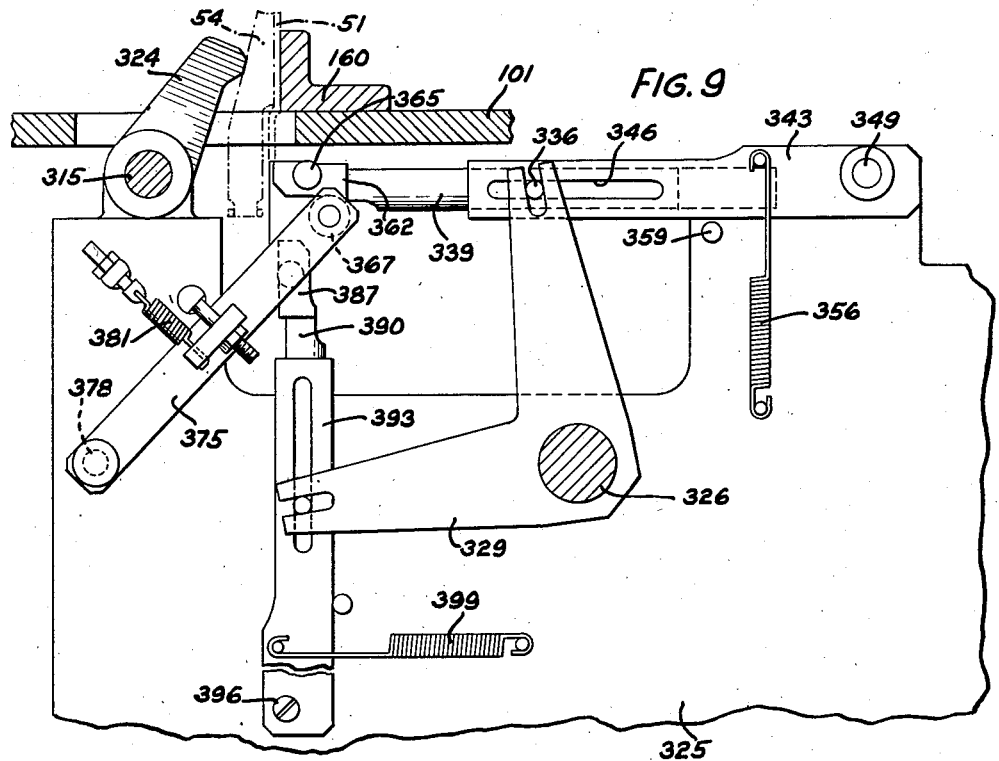
Figure 10:
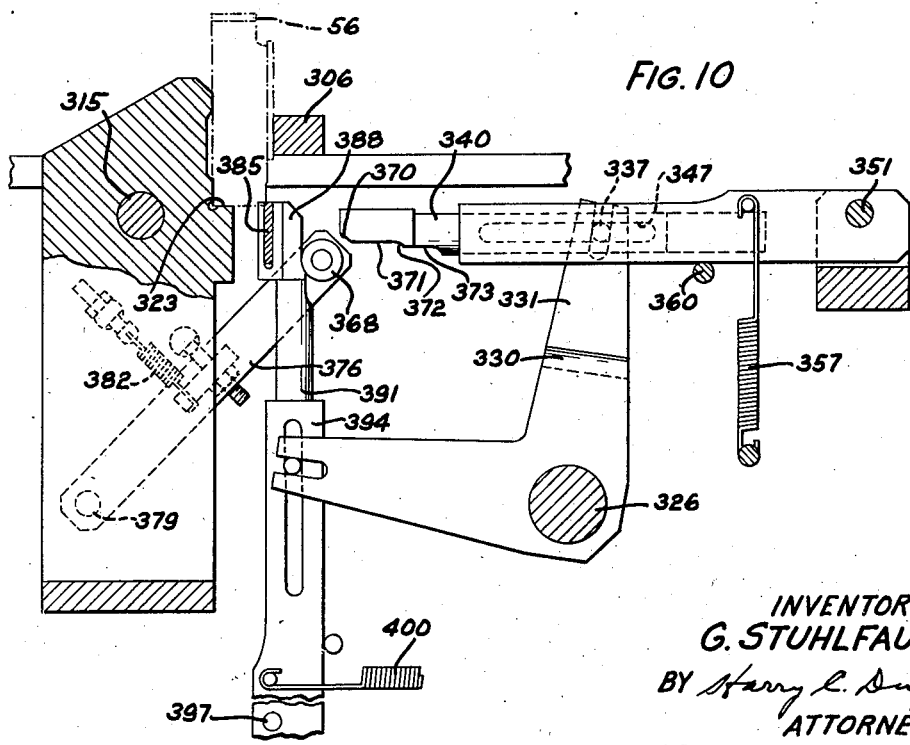

Fig. 8 is an enlarged fragmentary plan view of the second or stoning and filing station of the machine, parts being broken away to more clearly show the details of the apparatus, and, when considered together with Figs. 9, 10 and 11, which are detail vertical sectional views taken through the apparatus along the lines 9—9, 10—10 and 11—11, respectively, of Fig. 8, show the mechanism for stoning and filing the legs of a pole piece and the projecting portion of the base which cooperates with one of the pole pieces to support the armature; and Fig. 12 is a vertical sectional view taken along the line 12—12 of Fig. 8 in the direction of the arrows showing the stones and file which remove the plating and machining burrs at the filing and stoning station.

Figure 2:
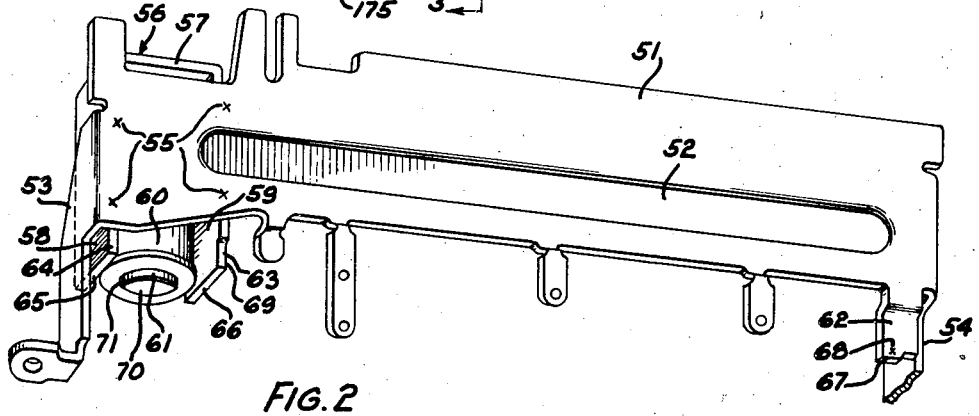
Fig. 2 is a view in perspective of a cross bar switch vertical unit sub-assembly, including a base member and an electromagnet and its pole pieces, which are to be machined in the apparatus.

In the drawings, wherein like reference characters designate the same parts throughout the several views, there is shown an apparatus designed to perform machining operations on a cross bar switch vertical unit base assembly, which is illustrated in Fig. 2, and which comprises a main base member 51, having a central longitudinal embossing 52, which serves to add rigidity to the base structure. Formed integrally with the base, are a pair of bent-over mounting arms 53 and 54, whereby the unit may be mounted on a framework (not shown) after the completion of the assembly of the various parts of the unit. Welded to the unit at the points 55—55, is a U-shaped pole piece, designated generally by the numeral 56, and having a base portion 57 and extending legs 58 and 59. Nested within the pole piece 56, is a magnet coil 60 wound around a core 61, which extends through the length of the coil and out through the base portion 57 of the pole piece and holds the coil in place on the pole piece 56. The main base member has formed integrally with it a number of extending lugs, which are not of interest in connection with the present invention, and it also has an extending portion 62, which cooperates with the leg 58 of the pole piece to pivotally support an armature (not shown) on the main base member.

The machine covered by the present invention is designed to prepare the main base member 51 and parts fixed thereto, as shown in Fig. 2, for the reception of the armature (not shown) and is designed to perform various operations on the core 61, the legs 58 and 59 of the pole piece 56 and on the extending portion 62 of the base. In the apparatus covered by the present invention, at the second operative station of the machine, the surfaces designated 64, 65, 66, 67 and 68 are to be stoned and the edge 69 is to be filed to remove the excess plating material from the surfaces 64, 65, 66, 67 and 68 and remove the milling or machining burr from the edge 69. It will be understood that base member 51 and pole piecee 56, after they are welded together, are plated and that the stoning operations remove the excess plating material from the surfaces 64, 65, 66, 67 and 68.

In the description of the apparatus for performing these operations on the vertical unit sub-assembly, the general features of the apparatus will first be described and then the stoning and filing station will be described separately to simplify the description of the machine as much as possible.

*Main assembly and loading station*

Figure 1:
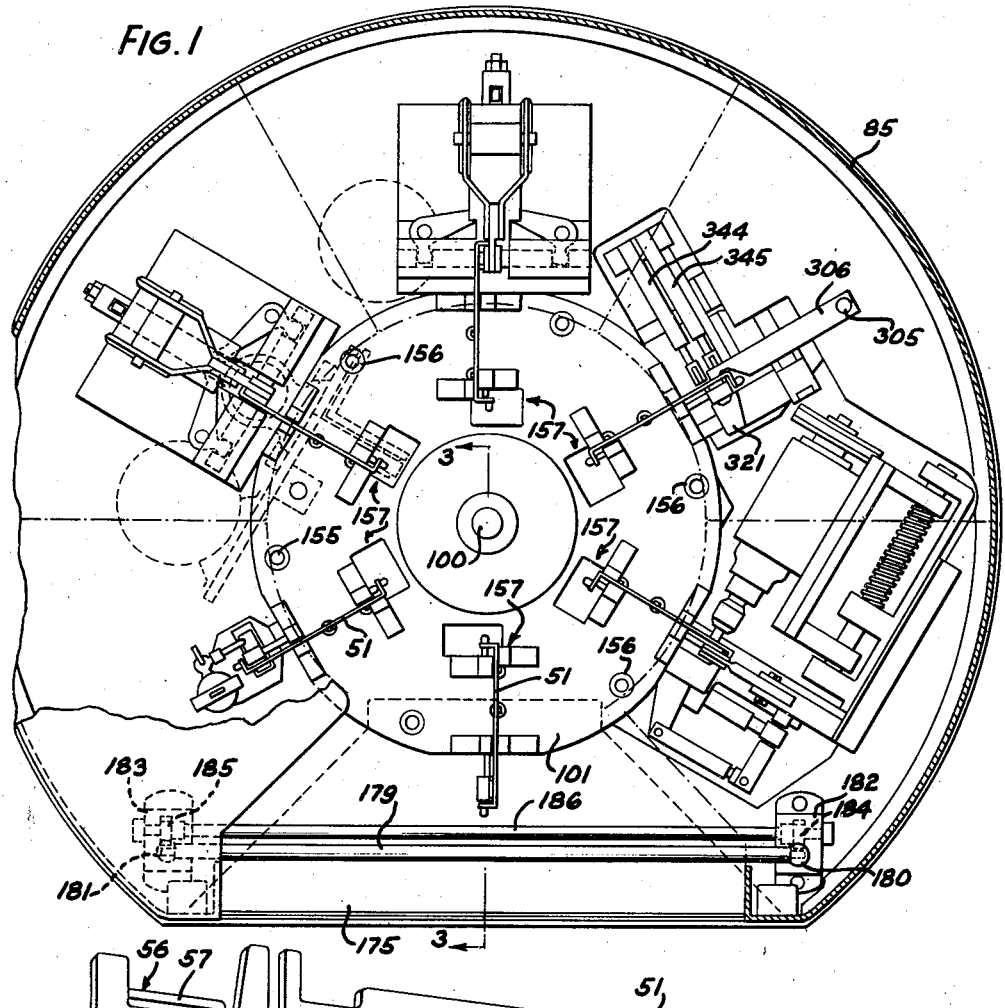
Figure 6:
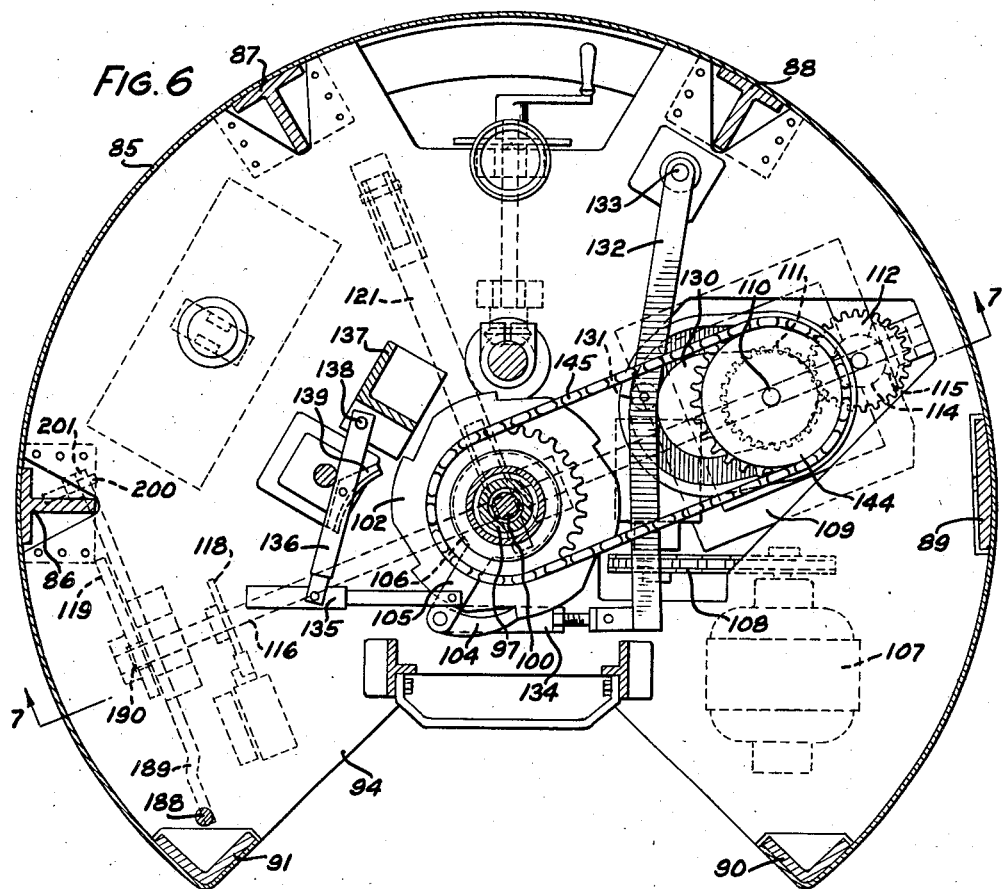
Fig. 6 is a plan view in section, taken substantially along the line 6—6 of Fig. 3 in the direction of the arrows, and shows somewhat in detail the main driving motor and its associated parts, together with the mechanism for intermittently driving the main spindle.

The machine, in general, comprises a circular casing 85, as shown most clearly in Figs. 1 and 6, which encloses all of the various operating parts of the apparatus. Within the casing 85 are a number of standards 86, 87, 88, 89, 90 and 91 (Fig. 6), which extend upwardly from a sub-base 92. The sub-base 92 rests on a circular angle member 93, which may be mounted upon the floor and fixed thereto in any suitable manner. The standards 86 to 91, inclusive, are of various shapes and their particular construction is immaterial to the present invention, except that they serve to support a main base member 94 and a support plate 95 on which the various parts of the apparatus are mounted, as will be described in detail hereinafter.

Figure 7:
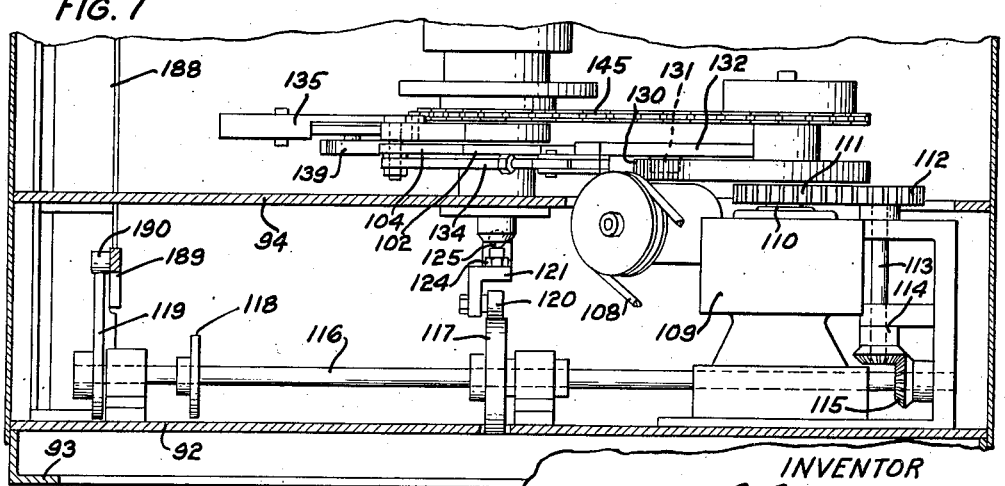
Fig. 7 is a fragmentary vertical sectional view, taken substantially along the line 7—7 of Fig. 6 in the direction of the arrows, and showing, in side elevation, some of the parts shown in Fig. 6.

Mounted centrally in the main base member 94, particular reference being had at this time to Figs. 3, 6 and 7, is a main bearing 96, in which there is freely rotatable a sleeve 97. An upper bearing 98 is fixed in the supporting plate 95 and cooperates with the bearing 96 to rotatably support the sleeve 97. Keyed to the sleeve 97 at 99 is a spindle 100, which is rotatable with the sleeve 97, but which may be reciprocated vertically within the sleeve. The spindle 100 has mounted at its upper end a turn table 101, which, upon reciprocation of the spindle, will be elevated and lowered and which, upon rotation of the spindle, will be carried around by the spindle to carry parts supported by it to the various stations of the machine. A ratchet 102 surrounds and is keyed to the sleeve 97 by means of a key 103 (Figs. 3 and 6). The ratchet 102 is adapted to be driven by a pawl 104 mounted upon a pawl arm 105, which is formed integrally with a collar 106 oscillatable about the hub of the ratchet 102. Power is supplied for driving the pawl 104 from the motor 107, which is mounted upon the sub-base 92, and, through a belt 108, drives a speed reducer 109 (Figs. 6 and 7). The main drive shaft extending from the speed reducer is designated 110 and carries a gear 111, which, in turn, meshes with a gear 112 mounted on a stud shaft 113, and carrying a beveled gear 114 meshing with a beveled gear 115. The beveled gear 115 is mounted upon a cam shaft 116, suitably journalled on the sub-base 92, and carrying three cams 117, 118 and 119. The cam 117, as most clearly shown in Figs. 3 and 7, has a cam roller 120 bearing against it and supporting a cam arm 121. The cam arm 121 is pivotally mounted on a bracket 122 extending downwardly from the main base member 94 by means of a pin 123 (Fig. 3). Mounted upon the cam arm 121, directly above the cam roller 120, is a threaded adjustable abutment 124, which engages a pivot ball 125 suitably fixed in the lower end of the spindle 100, whereby reciprocatory motion is imparted to the spindle in a vertical plane to raise the turn table 101 cyclically in the operation of the machine. Directly above the gear 111, there is mounted, upon the shaft 110, a grooved cam wheel 130, in the groove of which there is positioned a cam roller 131. Cam roller 131 is rotatably mounted on a cam lever 132 (Figs. 6 and 7). Cam lever 132 is pivotally mounted, at 133, on the main base member 94. An adjustable link 134 interconnects the free end of the cam lever 132 with the pawl arm 105 and imparts oscillatory motion to the pawl. In other words, for each cycle of the cam wheel 130, the pawl 104 will be oscillated about the sleeve 97 to step the ratchet 102 one place. Pivotally connected to the pawl arm 105 is a link 135, which has pivotally connected to it a lever 136. The lever 136 is pivotally connected to a bracket 137 mounted on the main base member 94 by means of a pivot pin 138 and carries a loosely mounted brake shoe 139 adapted to engage the surface of the ratchet 102 as the ratchet reaches the end of its indexing movement each time the ratchet is indexed.

A further extension of the shaft 110 carries a chain gear 144, which drives a chain 145 to transmit rotary motion to a chain gear 146, suitably fixed to a cam sleeve 147. The cam sleeve 147 is mounted for rotation about the sleeve 97 by means of bearings 148 and 149 and has a series of cams 150, 151, 152, 153 and 154 fixed to it. The cam 150 drives the chamfering unit of the apparatus; the cam 151 drives the milling tool for milling the core face; the cam 152 drives the apparatus for under-cutting one of the legs of the magnet pole piece; the cam 153 drives the cam for stoning the projecting portion of the vertical unit base, the two legs of the magnet pole piece, and the apparatus for filing the intermediate leg of the magnet pole piece, which has been undercut; and the cam 154 drives the lacquer applying mechanism. The various pieces of apparatus which these cams drive have been mentioned in a general way only and the portion thereof relating to this application will be described in detail hereinafter.

From the foregoing, it is believed to be apparent that the spindle 100 may be moved upwardly by the cam 117, and, while in an upward position, may be rotated through one-sixth of a revolution by means of a pawl 104 and ratchet 102. When the turn table mounted on the end of the spindle 100 is in its lower position, as shown in Fig. 3, a pin 155 (Fig. 1) extending upwardly from the upper surface of the supporting plate 95 will enter one of a series of bushings 156 set into the turn table 101 and accurately position the turn table. When the spindle 100 is raised, the bushing 156 will be drawn off of the pin 155 and rotary motion may be imparted through the sleeve 97 and spindle 100 to the turn table 101 to carry a piece of apparatus mounted in one of the sets of fixtures, designated generally by the numeral 157, step by step to the various machining positions of the apparatus. There are six of the sets of fixtures 157 provided about the periphery of the turn table 101 and are designated generally in Fig. 1 by the numeral 157, the details of these fixtures being shown in Figs. 3, 4 and 5. As seen in Fig. 4, the fixture 157 comprises four angle brackets 160, 161, 162 and 163. The brackets 160 and 161 serve as bases against which the main base member 51 of the vertical unit may be pressed by a spring-pressed ball 164 mounted in the angle bracket 162 and engaging against the embossing 52 of the main base member of the vertical unit. The angle bracket 162 also has mounted in it a spring-pressed plunger 165, which bears against the mounting arm 54 of the vertical unit to draw the inner leg 59 of the pole piece 56 against a fixed stop 166 mounted in the angle bracket 163. It will be understood that this fixture 157, of which there are six provided, simply serves to loosely hold the vertical unit subassembly during the travel of the turntable 101 to carry the parts being worked upon to the various operating stations of the apparatus.

*The loading and unloading station*

An operator feding parts to and removing them from the apparatus sits at the machine adjacent the flattened forward portion thereof, as shown in Fig. 1, and after starting the machine in operation through the operation of any suitable switch to supply electrical current to the various electrical motors, the turn table will be intermittently indexed and all of the parts of the apparatus will operate simultaneously to perform operations on a sequence of articles placed in the fixture 157 by the operator. At the loading and unloading station, there is provided means for preventing the operator's hands and forearms from getting caught in the apparatus. This mechanism comprises a hinged gate 175, hinged at 176 to an angle member 177. The hinged gate folds downwardly to its open position, as shown in dot and dash lines at 178, every time the turn table 101 assumes the position as shown in Figs. 1 and 3. The upper half of the hinged gate 175 is set into a round rod 179, which is pivoted at its opposite ends in a pair of vertically reciprocable racks 180 and 181. The racks 181 are slidable in bearing blocks 182 and 183, respectively, in which there are positioned gears 184 and 185, respectively, which mesh with their respective racks. The gears 184 and 185 are interconnected by a shaft 186. A downwardly extending portion 187 of the rack 181 has fixed to it a push rod 188 (Figs. 3, 6 and 7). The push rod 188 is mounted on the extending end of a pivoted lever 189, which carries a cam roller 190. The lever 189 is pivoted at 200 to a bracket 201 mounted on the side of standard 86, and once in each cycle of the machine, that is, each indexing of the turn table 101, the push rod 188 will be reciprocated to rotate the gears 184 and 185 first in one direction and then in the opposite direction to move the gate 175 upwardly and hold it in that position during the indexing of the turn table 101. When the gate 175 is in its lowermost position, the turn table 101 will be stationary and the various operating mechanisms at the five operating stations will be performing work on the part being machined. During this interval, an operator may remove a vertical unit sub-assembly from the fixture 157 in front of him at that particular time and may insert another sub-assembly in the fixture 157 so that it may be carried around at the various stations and properly machined. It will be understood that the fixture 157 simply holds the vertical unit sub-assembly in position by light spring pressure exerted on the spring-pressed pawl 164 and the plunger 165.

The turn table 101 rotates in a counter-clockwise direction, as shown in Fig. 1. A sub-assembly mounted in the fixture 157 at the loading and unloading station will first be carried to the leg milling station, where an operation not relevant to the present invention will be performed on it, and the turn table 101 will be elevated and indexed one step to carry the sub-assembly, which has thus been machined, to the next operating station, which is the stoning and filing station.

Stoning and filing station

The mechanism for stoning the surfaces 64, 65, 66, 67 and 68 and for filing the edge 69 of the sub-assembly being worked upon is most clearly shown in Figs. 8 to 12, inclusive, to which reference will now be had. After the turn table 101 has been indexed to carry a sub-assembly to the stoning and filing station, the turn table 101 will be lowered to the position as shown in Fig. 3, thereby to carry the sub-assembly base 51 to the position shown in dot and dash lines in Fig. 8. In this position, the sub-assembly will be clamped and held tightly by pneumatic actuated clamping mechanism, the actuating force for which is provided by a pneumatic cylinder 300, which is mounted, by means of brackets 301 and 302, on a vertically extending plate 303, which is suspended from the supporting plate 95, a fragment of which is shown in dot and dash lines in Fig. 11 and which is not shown in Fig. 8, but which is directly above the apparatus as shown in Fig. 8. The plate 303 has a bearing block 304 mounted upon it in which there is journalled a vertically extending shaft 305, which extends upwardly above the level of the supporting plate 95 and has fixed to its end a clamping arm 306. Fixed to the shaft 305 is a lever arm 307 (Fig. 11), in which there is pivotally mounted a yoke 308, adapted to be actuated by a piston rod 309, driven by the cylinder 300, and pinned to the yoke 308 by means of a pin 310. The yoke 308 serves also to actuate a link 311, which is pivoted on the yoke at 312 and connected at its opposite end by means of a pin 313 to a lever 314, which is, in turn, secured to a rock shaft 315. The shaft 315 is journalled in a bearing block 320 mounted on the plate 303 and having formed integrally with it an upwardly extending abutment 321 having a surface 322 adapted to be engaged by the rear surface of the legs 58 and 59 of the pole piece 56 when the main base member 51 of the sub-assembly is engaged by the arm 306. The bearing block 320 is also provided with a pair of surfaces 323—323 on which the rear ends of the legs 58 and 59 of the pole piece 56 will rest when the sub-assembly is clamped in this position. The end of the sub-assembly being worked on, which has an extending portion 62 thereon, is clamped against the angle bracket 160, as shown in Fig. 9, by a clamping element 324, which is fixed to the shaft 315 and engages the sloping surface of the supporting arm 54 of the sub-assembly and forces the base 51 of the sub-assembly against the angle bracket 160.

With a sub-assembly rigidly held by the clamping assembly just described upon the admission of air to the cylinder 300, the surfaces 64, 65, 66, 67 and 68 are stoned by the stoning mechanism and the edge 69 is filed by the filing mechanism, as will now be described. Extending downwardly from the supporting plate 95 is a vertically extending plate 325, which is quite similar to plate 303, and, together with the plate 303, provides a bearing in which a rock shaft 326 is oscillatable. Fixed to the left end of the shaft 326 (Fig. 8) is a cam arm 327 carrying a cam roller 328, which engages the cam 153 on the main cam shaft or spindle assembly, as shown in detail in Fig. 3. The shaft 326 also has fixed to it a pair of bell cranks 329 and 330 and the lever 330 is bifurcated to provide two upwardly extending arms 331 and 332. The bell crank 329 has a slot 333 formed in its upwardly extending arm and the arms 331 and 332 have slots 334 and 335 formed in them to receive pins 336, 337 and 338, respectively, which extend outwardly from slide members 339, 340 and 341, respectively. The slide members 339, 340 and 341 are slidably positioned in slide supports 343, 344 and 345, respectively, which have slots 346, 347 and 348, respectively, through which the pins 336, 337 and 338 extend for engagement by the slotted ends of the bell cranks 329 and 330. The slide support 343 is pivotally mounted on a pivot pin 349 mounted on the vertically extending plate 325 and the slide supports 344 and 345 are pivotally mounted in a bearing 350 being supported by a common pivot pin 351. Each of the slide supports 343, 344 and 345 are urged downwardly by coil springs 356, 357 and 358, respectively, into engagement with stop pins 359, 360 and 361 to normally retain them substantially in the position shown. The slide members 339, 340 and 341 have mounted at their left ends (Figs. 9, 10 and 11) stone supporting clamps 362, 363 and 364, all of identical construction, and each having a thumb screw 365 threaded in it for clamping stones 366 in place in the clamps. The underside of each of the slide members 339, 340 and 341 has graduated cam surfaces thereon adapted to ride on cam rollers 367, 368 and 369. Since all of these cams are identical in construction, the one most clearly shown, which is in Fig. 10, will be described in detail and this comprises a sloping surface 370, a flat surface 371, a sloping surface 372 and a flat surface 373. In the operation of the slides, when they are moved to the left by their respective bell crank levers, the sloping surface 370 will first engage the cam roller engaged with that particular slide to elevate the slide against the force exerted by the spring 357. Further advancement of the slide to the left will cause the surface 371 to bear against the cam rollers and move the stones carried by the slides under the surfaces 65, 66 and 67. When the sloping cam surfaces 372 engage the roller of its respective slide, the rollers, which are urged upwardly, as will be described, will force the stone against the surface to be stoned under a predetermined pressure, as will be described more in detail hereinafter. The stone will be reciprocated three times while the flat surfaces 373 of the cams are in engagement with their respective cam rollers, thereby to stone the surfaces 65, 66 and 67 on the sub-assembly being operated upon. The cam rollers 367, 368 and 369 are mounted on the free ends of levers 375, 376 and 377, respectively. These levers are pivotally mounted on the vertically extending plates 303 and 325 and are urged to rotate about pivot pins 378, 379 and 380 by coil springs 381, 382 and 383, which are relatively stronger than the coil springs 356, 357 and 358.

It will be understood that the contour of the cam 153 (Figs. 3 and 8) is such that in its rotation, it will rock the shaft 326 in a counter-clockwise direction (Figs. 9, 10 and 11) far enough to carry the stones 366 under their associated portions of the article being worked upon and will then oscillate the shaft 326 slightly to cause the stones 366 to move back over their corresponding surfaces with which they are in engagement three times and then the shaft 326 will be rocked in a clockwise direction sufficiently to carry similar stones 384 upwardly into engagement with the surfaces 64 and 68 on the sub-assembly being operated upon and to carry a file 385 up against the edge 69 to thus stone the surfaces 64 and 68 and removing the milling burr from the edge 69. The stones 384 are carried in stone supporting clamps 386 and 387 and the file is carried in a file supporting clamp 388. The stone supporting clamps 386 and 387 and the file supporting clamp 388 are mounted on the upper ends of slide member 389, 390 and 391. The slide members 389, 390 and 391 are slidable in slide supports 392, 393, and 394 and are adapted to be actuated by the horizontally extending legs of the bell crank levers 329 and 330. Slide supports 392, 393 and 394 are normally urged to rotate in a clockwise direction about pivot pins 395, 396 and 397 by coil springs 398, 399 and 400, suitable pins being provided for preventing the slide supports from rocking too far in a clockwise direction in a manner similar to that which was provided for the slide supports 343, 344, and 345. The right hand surface of the slide members 389, 390 and 391 have cam surfaces formed thereon which are identical with those formed on the slide member 340 and the operation of these slide members is exactly the same as described in connection with the slide member 340.

From the foregoing, it is believed to be apparent that a sub-assembly carried to the stoning and filing station will be clamped into position in the stoning and filing station by the pneumatically actuated clamps described in detail hereinbefore and that the surfaces 64, 65, 66, 67 and 68 thereof will be stoned at that station and the edge 69 thereof will be filed to remove the milling burr from it. It will also be understood that each time the turn table 101 is indexed, these operations will be carried on at the stoning and filing station on any sub-assembly which has been carried to that station.

Just prior to the next step of indexing the turn table 101, the air under pressure in the cylinder 300 will be released, thereby to release the clamps which were holding the sub-assembly firm at the stoning and filing station, and the turn table 101 will be elevated and indexed to carry the stoned and filed sub-assembly to the next station. In the succeeding stations of the apparatus, other operations not pertaining to the present invention will be performed on the sub-assembly being worked upon and the sub-assembly will be returned to the loading and unloading station, where it may be removed and a new sub-assembly inserted in the fixture 157.

What is claimed is:

1. In an apparatus for operating upon cross bar switch vertical units, a periodically indexed turn table, a fixture on said turn table for receiving a part to be worked upon, means at one of the index points or stations of said apparatus for squaring a corner of said apparatus comprising a pair of stones normally positioned substantially at right angles one to another and in substantially the same vertical plane, a bell crank lever interconnected with said stones for imparting reciprocatory motion to the stones to alternately rub the stones on the surfaces to be squared, and camming means associated with said stones for directing them into engagement with the surfaces to be stoned.

2. In an apparatus for operating upon cross bar switch vertical units, a periodically indexed turn table, a fixture on said turn table for receiving a part to be worked upon, means at one of the index points or stations of said apparatus for squaring a corner of said apparatus comprising a pair of stones normally positioned substantially at right angles one to another and in substantially the same vertical plane, a bell crank lever interconnected with said stones for imparting reciprocatory motion to the stones to alternately rub the stones on the surfaces to be squared, cam members individual to each of said stones, and a common cam roller associated with both of said cam members for moving the stones into association with the surfaces to be stoned.

3. In an apparatus for operating upon cross bar switch vertical units, a periodically indexed turn table, a fixture on said turn table for receiving a part to be worked upon, means at one of the index points or stations of said apparatus for squaring a corner of said apparatus comprising a pair of stones normally positioned substantially at right angles one to another and in substantially the same vertical plane, a bell crank lever interconnected with said stones for imparting reciprocatory motion to the stones to alternately rub the stones on the surfaces to be squared, cam members associated with each of said stones, and a resiliently supported cam roller alternately engaged by said cam members to move said stones into engagement with the surfaces to be stoned under a predetermined pressure.

4. In an apparatus for machining articles, a stoning station for squaring a corner of the article, a pivoted bell crank lever, means for oscillating said bell crank lever about its pivot, a pair of slide members mounted for actuation by said bell crank in planes at right angles one to another, a camming member formed integrally with each of said slide members, a grinding member mounted on each of said slide members for grinding angularly disposed surfaces of the article, and a cam roller common to both of said cam members for cooperating with the cam members to urge the grinding members into engagement with the surfaces to be ground.

5. In a machining apparatus, a corner squaring mechanism including a plurality of vertically reciprocable grinding members, a plurality of horizontally reciprocable grinding members, said vertically and horizontally reciprocable members being arranged in pairs, and a plurality of supports for resiliently supporting the grinding members during their reciprocation, said supports each being common to a vertically reciprocable member and a horizontally reciprocable member.

6. In a machining apparatus, a corner squaring mechanism including a plurality of grinding members arranged in pairs, the members of each pair being reciprocable in planes at right angles one to another, and a resilient support associated with each pair of grinding members to urge the members associated with it into engagement with the surfaces which meet to make the corner.

7. In a machine apparatus, a corner squaring mechanism including a plurality of grinding members arranged in pairs, the members of each pair being reciprocable in planes at right angles one to another, cam members fixed to said grinding members, and a resiliently mounted cam roller associated with each pair of grinding members to urge the grinding members into engagement with the surfaces to be ground to form the corner.

8. In a machining apparatus, a flat grinding member, a reciprocable slide for supporting the grinding member, means for reciprocating said slide, a slide supporting element biased to hold the grinding member out of engagement with a surface to be ground, a cam surface formed on the slide, and resilient means for engagement with said cam surface to force the slide supporting element to carry the grinding member into engagement with the surface to be ground.

9. In a machining apparatus, a grinding member, a slidable member for supporting said grinding member, a power actuated lever for imparting movement to said slidable member, resilient means normally tending to hold said slidable member in a position to hold the grinding member away from the surface to be ground, a cam surface formed on the slidable member, and a spring pressed cam roller for engaging said cam surface to overcome the resilient means and force the slide to move the grinding member against the surface to be ground at a predetermined pressure.

10. A corner squaring apparatus comprising a plurality of reciprocable grinding members arranged in pairs, the members of each pair being reciprocable at right angles one to another to square a corner, a support for resiliently supporting each of said pairs, and an oscillatable lever for actuating both of the members of a pair of members.

11. In a machining apparatus, a corner-squaring mechanism including a plurality of grinding members arranged in pairs, the members of each pair being reciprocable in planes at right angles one to another, a resilient support associated with each pair of grinding members to urge the members associated with it into engagement with the surfaces which meet to make the corner, and a common actuator for each pair of grinding members comprising an oscillatable lever for imparting reciprocation to the pair of members associated with it.

GEORGE STUHLFAUTH.